Aug. 2, 1927. 1,637,543
A. C. BARROWS
BALE DIVIDING DEVICE
Filed April 20, 1925
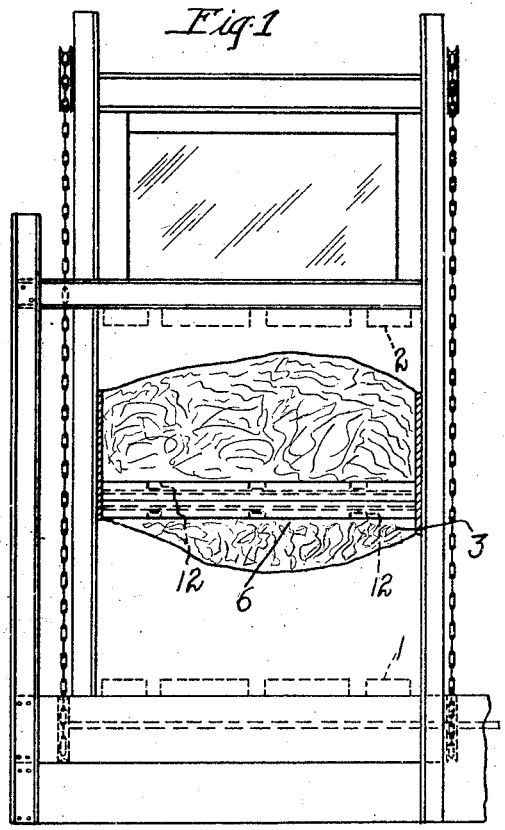
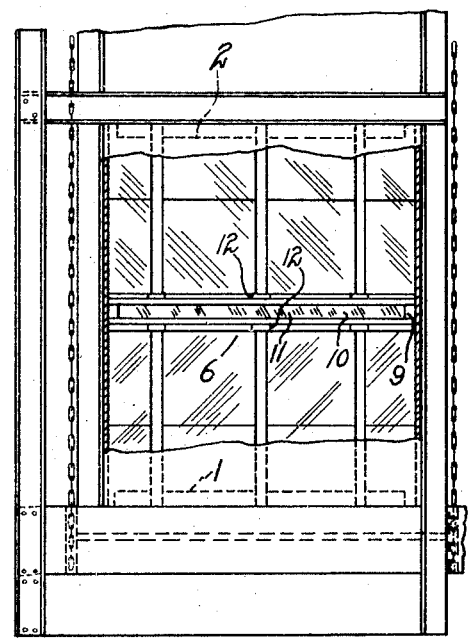
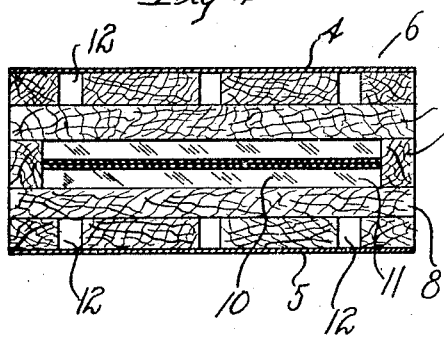
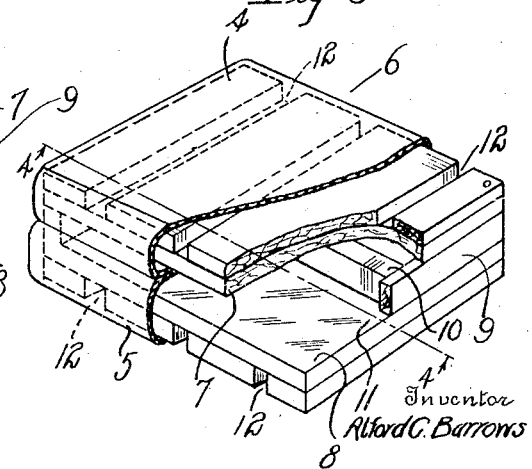
Inventor
Alford C. Barrows
Attorneys Patented Aug. 2, 1927.

1,637,543

UNITED STATES PATENT OFFICE.

ALFORD C. BARROWS, OF ANN ARBOR, MICHIGAN, ASSIGNOR TO ECONOMY BALER COMPANY, OF ANN ARBOR, MICHIGAN, A CORPORATION OF MICHIGAN.

BALE-DIVIDING DEVICE.

Application filed April 20, 1925. Serial No. 24,603.

The invention relates to baling presses and refers more particularly to devices for dividing the material being compressed into bales. One of the objects of the invention is the provision of a device for dividing the material into bales which has provision for receiving a portion of the bale covering material during the time the material is being compressed into bales. Another object is the provision of a bale dividing device which in addition to having provision for receiving a portion of the bale covering material during the time the material is being compressed has channels in its walls located adjacent to the bales for receiving bale ties. With these as well as further objects in view the invention resides in the novel features of construction and combinations and arrangements of parts as more fully hereinafter set forth.

In the drawings:—

Figure 1 is a front elevation partly broken away of a portion of a baling press employing the bale dividing device embodying my invention;

Figure 2 is a similar view showing the bale coverings applied to the bales;

Figure 3 is a perspective view of the bale dividing device;

Figure 4 is a cross section on the line 4—4 of Figure 3.

As shown in the present instance 1 and 2 are respectively lower and upper abutment members of the baling press, the upper abutment member being a platen movable toward and away from the lower abutment member. 3 is the baling chamber of the press, this baling chamber for certain types of work having side walls and for other types of work being open.

For dividing the material being compressed in the baling chamber into bales and at the same time making provision for the strips 4 and 5 of covering material for the adjacent ends of the bales so that these strips, which are preferably fabric, will not become entangled with the material being baled, I have provided the bale dividing device 6 which is insertable into the baling chamber 3 of the press and has an area substantially equal to the cross sectional area of this baling chamber. This bale dividing device comprises the spaced upper and lower walls 7 and 8 respectively, which are separated by means of the end walls 9 and the middle wall 10 extending between the end walls 9.

The upper strip 4 of covering material has an intermediate portion lying against the upper surface of the upper wall 7, while the lower strip has an intermediate portion lying against the lower surface of the lower wall 8. The end portions of both of these strips are insertable into the chambers 11 formed between the upper and lower walls of the bale dividing device and remain there during the relative movement of the abutment members toward each other or during the time the material is being compressed. As a consequence these end portions may be readily removed when the material has been compressed to the desired degree and then moved against the sides of the bales, the upper strip being moved against the sides of the upper bale and the lower strip against the sides of the lower bale. The upper and lower walls 7 and 8 of the bale dividing device are also preferably provided with the substantially parallel channels 12 extending from front to rear and are adapted to receive suitable bale ties after the end portions of the strips of covering material have been removed from between the upper and lower walls of the device.

It will be seen from the above description that I have provided a simple construction of bale dividing device which has provision for receiving portions of the strips of bale covering material which are intended to lie adjacent to the sides of the bales when completed, so that these portions will not become entangled with the material during the baling operation. It will also be seen that my bale dividing device has provision for receiving the bale ties so that the latter may be readily inserted at the ends of the bales when they are being passed there around for tying.

What I claim as my invention is:

1. A bale dividing device for baling presses using covering material for bales comprising upper and lower walls against which a portion of said covering material lies, said device also having provision for receiving another portion of said covering material during the time the material to be baled is being compressed.

2. A bale dividing device for baling presses using strips of covering material for bales comprising spaced walls against which a portion of each strip lies and between which another portion of each strip may be inserted during the time the material to be baled is being compressed.

3. A bale dividing device for baling presses using covering material for bales comprising walls with sides against which portions of the covering material lie and also having provision for receiving other portions of said material during the time the material to be baled is being compressed, said walls having channels therein for receiving ties for the bales.

4. A bale dividing device for baling presses using strips of covering material for bales comprising spaced walls with faces against which portions of said strips lie and between which other portions of the strips are insertable during the time the material to be baled is being compressed, said walls also having channels for receiving ties for the bales after the portions of the strips have been moved from between the walls.

5. A bale dividing device for baling presses using relatively movable abutment members for compressing material, comprising spaced upper and lower walls positioned between the abutment members, covering material for the bales having portions normally resting against the outer faces of said device and having other portions insertable between said walls during the time the material is being compressed.

In testimony whereof I affix my signature.

ALFORD C. BARROWS.